J. E. COOPER.
ANTIFRICTION MECHANISM FOR CAR TRUCKS.
APPLICATION FILED MAR. 17, 1915.
1,140,300.
Patented May 18, 1915.
2 SHEETS—SHEET 2.
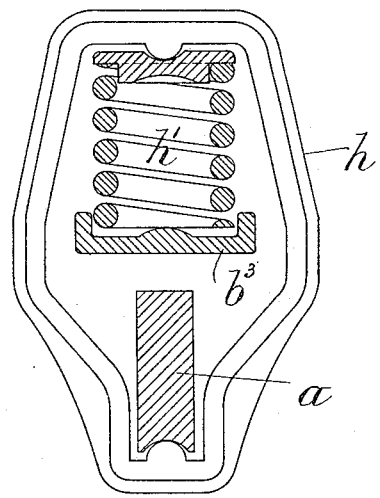
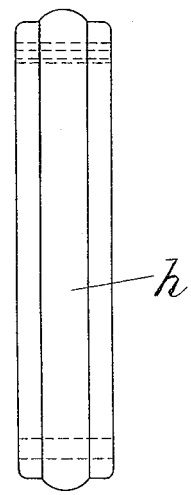
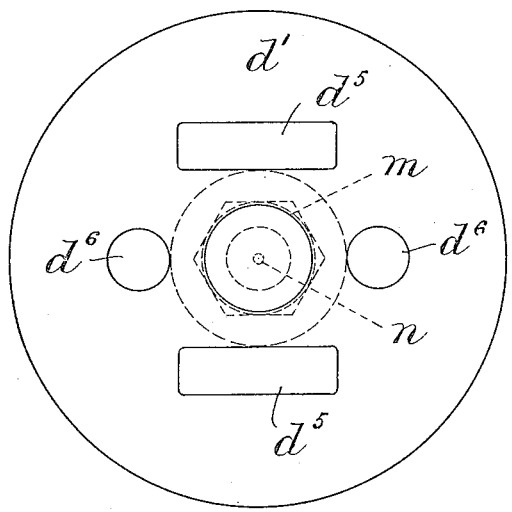
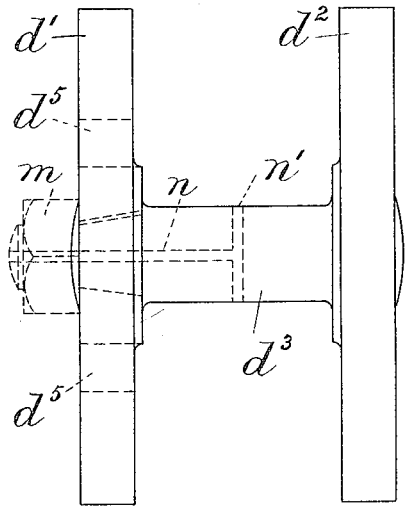

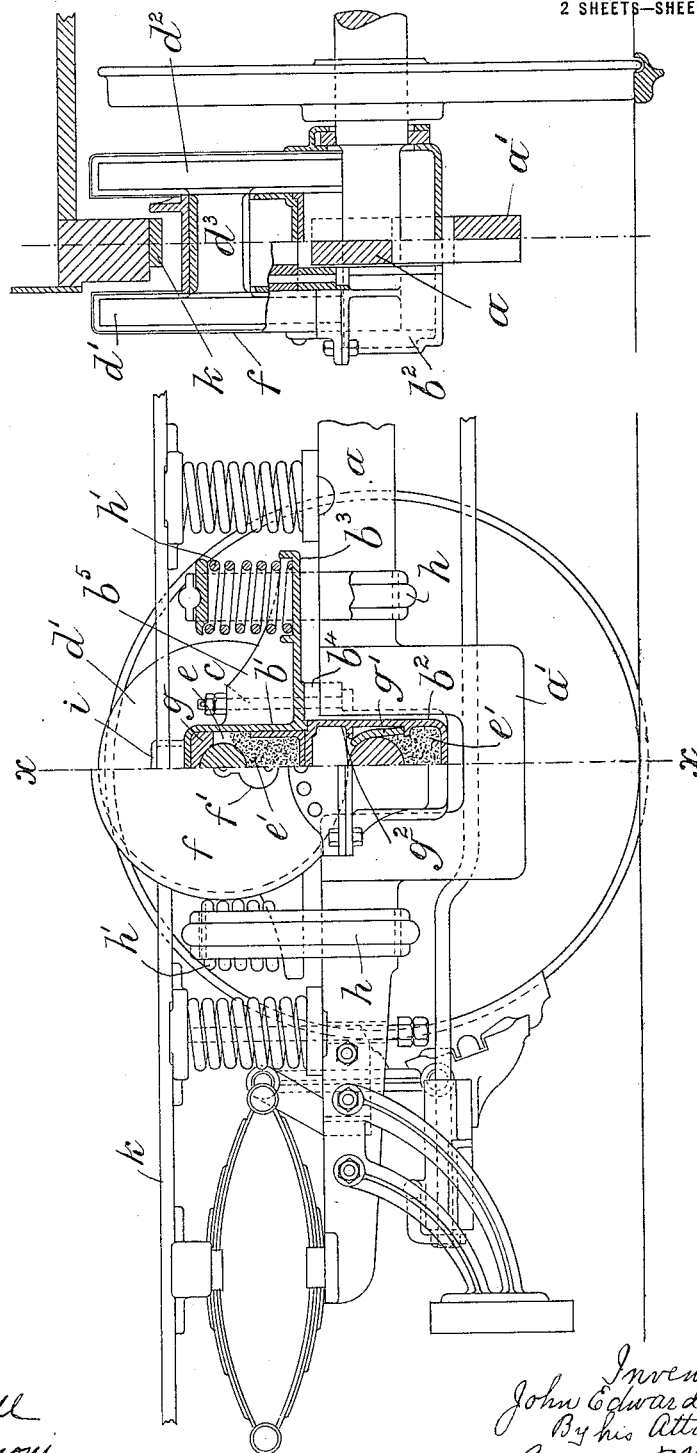

UNITED STATES PATENT OFFICE.

JOHN EDWARD COOPER, OF STRATFORD, LONDON, ENGLAND.

ANTIFRICTION MECHANISM FOR CAR-TRUCKS.

1,140,300.   Specification of Letters Patent.   Patented May 18, 1915.

Application filed March 17, 1915. Serial No. 15,040.

*To all whom it may concern:*

Be it known that I, JOHN EDWARD COOPER, a subject of the King of Great Britain and Ireland, residing at Stratford, in the county of London, England, have invented certain new and useful Improvements in Antifriction Mechanism for Car-Trucks; and I do hereby declare the following to be a full, clear, and exact description of the invention, such as will enable others skilled in the art to which it appertains to make and use the same.

This invention relates to improvements by which antifriction mechanism of the kind described and illustrated in the specifications of my former Letters Patent Nos. 621,483, 681,650, 764,427; 769,130, and 878,355 is brought into coöperation with the arrangement of parts and means for suspending the truck or under carriage of tramway vehicles on springs supported from the axle journal boxes in a manner adapted to relieve the effects of side thrust when rounding curves and lurching or other shocks when traveling over a rough and bumpy road, the said improvements further conducing to the perfecting of the aforesaid mechanism for the attainment of easy traveling.

With respect to affording relief to side thrust when rounding a curve, or to shocks from lurching on a bumpy road I am aware that mechanism has been devised for this purpose in which the side frames instead of being mounted rigidly on the axle boxes are mounted on springs supported from the axle boxes by staple shaped links, the side frames and their superincumbent load being thus in a state of suspension relatively to the axle shafts on which they ride, thus allowing the truck or under carriage to sway sufficiently to relieve shocks due to side thrusts or lurching and in some cases the sill or carplate is supported on the side frame by a series of spiral and elliptical or laminated springs, the side frames being cranked or recessed upward for the reception of the axle boxes to which arrangement the other or coöperating parts are adjusted in various modifications. Whereas in carrying out my invention I adopt a combination of working parts and structural arrangements in which the side frames are cranked or recessed downward instead of upward for the accommodation of the lower part of a double axle box in which the main axle is journaled the upper part being provided with flanges extending in opposite directions along the side frame and used as a journal for the axle shaft of the antifriction wheels, the side frames and their load being supported in a state of suspension from the aforesaid flanges of the axle box above by means of spring cushioned links.

In carrying out my invention as above I adopt the requisite combination of working parts and structural arrangements of which the following is a general and detailed description of what I consider to be a convenient embodiment of my invention and which I prefer to employ and in order that the carrying out of the same in practice may be readily understood and clearly differentiated from previously devised mechanisms of the kind already referred to, I have illustrated it on the accompanying drawings in which:—

Figure 1 is a side elevation of that part of a side frame where it is connected with the mechanism by which it is held in suspension from the flanges of the axle box of the antifriction wheels certain parts being in section to show the interior of the axle boxes. Fig. 2 is an end view with a part in section as taken on line $x$ $x$ of Fig. 1. Figs. 3, 4, 5, and 6 are detail views as hereinafter explained and are drawn to a larger scale.

For the purpose of my invention the side frames $a$ are cranked or recessed at $a'$ downward instead of upward for the accommodation of the lower part of the axle box which is made in two parts $b'$ $b^2$ bolted together through their flanges $b^3$ $b^4$ by the bolts $c$ which parts may be conveniently designated the upper and lower axle boxes $b'$ $b^2$ respectively. This enables the antifriction wheels $d'$ $d^2$ with their intervening shaft $d^3$ to be made in one steel casting when this is desirable as shown in Fig. 3.

Each axle box $b'$ contains an oil space $e$ fitted with wool packing $e'$ to absorb oil which may be introduced through an opening in the dust-shield $f$ which is covered by a swinging slide $f'$. Holes $d^5$, $d^6$ are formed in the outer wheel $d'$, as shown in Figs. 3 and 4. A bearing block $g$ may be introduced through either one of the holes $d^5$ and the wool packing and oil may be introduced through either one of the holes $d^6$. The wheels may be rotated to bring the openings $d^5$, $d^6$ opposite the opening in the dust-shield.

The flanges $b^3$ of this upper axle box $b'$ extend in either direction along the run of the side frames $a$ as shown in Fig. 1 which flanges are supported by webs $b^5$ to afford great strength so that links $h$ $h$ passing under the side frames $a$ and over helical or spiral springs $h'$ seated on these flanges $b^3$ can be adapted to take the full strain of the load above which is thereby sustained in a state of suspension from the upper or antifriction axle shafts $d^3$ which load including the car truck and underframe can by means of such suspension on springs oscillate or vibrate bodily in a slight degree as and for the purposes already indicated.

In addition to the bolts which bolt the two axle boxes together or the flanges thereof other bolts secure the top axle box in position relatively to the side frame subject to slight variations due to the oscillation or vibration of the car.

The lower axle box $b^2$ is fitted with wool packing $e'$ in its lower part for lubrication and inclined bearings $g'$ such as those described with reference to Figs. 3 and 4 in the specification of my former Letters Patent No. 878355 which bearings are let into position on either side of the main axle and abut against internal ledge shaped projections $g^2$ on the walls of the axle box $b^2$.

$i$ is a lug on the upper axle box $b'$ projected from the top thereof as shown to prevent side play of the car truck.

The sill or car plate $k$ is shown in Fig. 1 as supported on the side frames $a$ by a system of laminated elliptical and helical or spiral springs this arrangement being known in connection with the mechanism devised for supporting the car truck in spring cushioned suspension from the main or carrier axle box as being conducive to the attainment of the object in view and is similarly applicable when spring cushioned suspension is supported as by my present invention from the axle shaft of antifriction wheels by means of the links $h$ as shown in separate detail in Figs. 5 and 6 as well as in position in Fig. 1.

In this mechanism the links $h$ pass under the side frame $a$ and over the helical or spiral springs $h'$ seated on the flanges $b^3$ of the upper axle box $b'$.

It will now be seen that by a proper adjustment of the parts while the car truck and its load is held in suspension from the flanges of the antifriction shaft axle box a rolling contact is insured between the antifriction wheels or rollers with their shafts journaled in the said axle box, and the main shaft journaled in the lower axle box housed or accommodated in the crank or recess in the side frame the arrangement being attended with all the advantages as hereinbefore indicated. But inasmuch as that the outer antifriction wheel comes close in front of the antifriction shaft axle box so that holes through its web do not afford a satisfactory access to the interior of the said axle box which has to be liberally supplied with a lubricant and requires an easy access to its interior for renewals I prefer in some cases to make the outer antifriction wheel removable in the manner shown in dotted lines in Fig. 3 in which the outer end of the shaft $d^3$ is made like the frustum of a cone with a key affixed thereto so that the wheel $d'$ can be slid on or off and when on is secured in position by a nut $m$.

$n$ is an oil passage extending lengthwise of the shaft $d^3$ and communicating by a cross passage $n'$ into the journal box. This allows the outer antifriction wheel $d'$ to be readily detached and re-affixed while the inner antifriction wheel $d^2$ can be made in one casting with the shaft.

It is of course obvious that the hereinbefore described mechanism being designed and adapted to form a definite connection between the side frames and the main frame of the car or truck which is mounted on them is applicable generally where the truck, car or other vehicle is similarly mounted on side frames adapted to be supported in suspension by spring cushioned links mounted on the axle boxes of the shafts which take the load.

Having thus described my invention, what I desire to claim and secure by Letters Patent of the United States is:—

1. The combination with a pair of truck wheels, their axle and its axle boxes, of the side frames of the truck having recessed portions below said axle boxes to receive them, antifriction wheels resting on the axle and having shafts connecting them, journal boxes for said shafts mounted over said axle boxes, spring-supporting flanges projecting laterally from the boxes, vertically arranged springs thereon, and swinging links supported by said springs and extending under the side frames.

2. The combination with a pair of truck wheels, their axle and its boxes, of side frames having recessed portions below said axle boxes to receive them, anti-friction wheels resting on the axle and having shafts connecting them, journal boxes for said shafts mounted over said axle boxes and formed with spring-supporting laterally projecting flanges extending over the upper edges of the side frames but a short distance above them, springs mounted on said flanges, vertically arranged supporting springs carried by the side frames, and swinging links supported by the springs on said flanges and extending under the side frames.

3. The combination with a pair of truck wheels, their axle and its boxes, of side frames having recessed portions below said axle boxes to receive them, journal boxes mounted above said axle boxes, a pair of anti-friction wheels resting on the axle near each end thereof, one of which wheels in each pair is outside its adjacent box and which is formed with holes for introducing a bearing and lubricating material to said box, and a shaft for each pair of anti-friction wheels extending through its journal box, and means for suspending the side frames from the boxes.

4. The combination with a pair of truck wheels, their axle and its boxes, of anti-friction wheels resting on said axle near each end thereof, a shaft for each pair of wheels which is detachably connected with one of them and which is provided with lubricant channels or passages, a journal box for each shaft interposed between the wheels and above each of said axle boxes and side frames suspended from said journal boxes.

5. The combination with a pair of truck wheels, their axle and its axle boxes, of a journal box above each of said axle boxes, a pair of anti-friction wheels resting on said axle near each end thereof, and one of which has openings for the introduction of a bearing block and lubricating material, a shaft connecting each pair of wheels, a journal box for each of said shafts arranged between the wheels, dust-shields for said anti-friction wheels having openings for the introduction of a bearing block and lubricating material and side frames suspended from said journal boxes.

In testimony whereof, I affix my signature, in presence of two witnesses.

JOHN EDWARD COOPER.

Witnesses:
H. D. JAMESON,
O. J. WORTH.

Copies of this patent may be obtained for five cents each, by addressing the "Commissioner of Patents, Washington, D. C."